United States Patent Office 2,934,552
Patented Apr. 26, 1960

2,934,552
SURFACE-ACTIVE AGENTS

Van R. Gaertner, Dayton, Ohio, assignor to Monsanto Chemical Company, St. Louis, Mo., a corporation of Delaware No Drawing. Application May 16, 1958
Serial No. 735,711

9 Claims. (Cl. 260—453)

The present invention relates to amido thiosulfates having surface-active properties.

According to the invention, there are provided certain new and valuable salts of N - (alkyloxyalkyl- or alkylthioalkyl) - 2 - (sulfothio)alkanecarboxamides by the reaction of an N-(alkyloxyalkyl- or alkylthioalkyl)-2-haloalkanecarboxamide with an alkali metal or ammonium thiosulfate substantially according to the scheme:

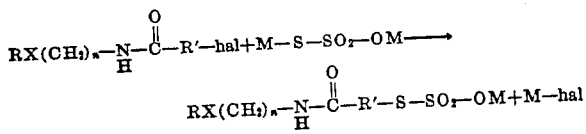

wherein R is an alkyl radical of from 8 to 18 carbon atoms, X is selected from the class consisting of oxygen and sulfur, n is an integer of from 2 to 4, R' is an alkylidene radical of from 1 to 3 carbon atoms, hal denotes halogen, and M denotes an inorganic cation selected from the class consisting of alkali metal and ammonium.

One class of 2 - haloalkanecarboxamides with which the thiosulfate is reacted in preparing the present sulfothioalkanecarboxamides includes the N - (β - alkyloxyethyl) - 2 - haloacetamides such as N - (2 - n - octyloxyethyl) - 2 - chloroacetamide, N - (2 - nonyloxyethyl) - 2 - bromoacetamide, wherein the nonyl radical is derived from a branched-chain nonanol prepared according to the "Oxo" process from carbon monoxide, hydrogen and diisobutylene, N - (2 - n - decyloxyethyl) - 2 - chloroacetamide, N - (2 - undecyloxyethyl) - 2 - bromoacetamide; N - [2 - (2 - ethylheptyloxy)ethyl] - 2 - chloroacetamide, N - [2 - (2 - butyloctyloxy)ethyl] - 2 - chloroacetamide, N - (2 - tert - dodecyloxyethyl) - 2 - iodoacetamide, N - (2 - tridecyloxyethyl) - 2 - chloroacetamide, wherein the tridecyl radical is derived from the branched-chain tridecanol obtained according to the "Oxo" process from carbon monoxide, hydrogen and propylene tetramer or butylene trimer, N - [2 - (7 - ethyl - 2 - methyl - 4 - undecyloxy)ethyl] - 2 - chloroacetamide, N - (2 - hexadecyloxyethyl) - 2 - chloroacetamide, wherein the hexadecyl radical is derived from the branched-chain "Oxo" process hexadecanol obtained by the reaction of carbon monoxide and hydrogen with propylene pentamer, and N - (2 - tert - octadecyloxyethyl) - 2 - chloroacetamide; the N - (3 - alkyloxypropyl) - 2 - haloacetamides such as N - (3 - isooctyloxypropyl) - 2 - chloroacetamide, N - (3-decyloxypropyl) - 2 - chloroacetamide wherein the decyl radical is derived from the "Oxo" process branched-chain decanol prepared by the reaction of carbon monoxide and hydrogen with propylene trimer, N - (3 - n - dodecyloxypropyl) - 2 - bromoacetamide, N - (3 - n - tetradecyloxypropyl) - 2 - iodoacetamide, N - (3 - hexadecyloxypropyl) - 2 - chloroacetamide wherein the hexadecyl radical is derived from the above-described "Oxo" process hexadecanol and N - (3 - octadecyloxypropyl) - 2 - chloroacetamide; the N - (4 - alkyloxybutyl) - 2 - haloacetamides such as N - (4 - n - octyloxybutyl) - 2 - chloroacetamide, N - (4 - n - nonyloxybutyl) - 2 - bromoacetamide, N - (4 - tert - dodecyloxybutyl) - 2 - chloroacetamide and N - (4 - octadecyloxybutyl) - 2 - iodoacetamide; the N - (2 - alkyloxyethyl) - 2 - halopropionamides such as N - (2 - tert - octyloxyethyl) - 2 - chloropropionamide, N - (2 - decyloxyethyl) - 2 - bromopropionamide wherein the decyl radical is derived from the above-described branched-chain "Oxo" process decanol, N - (2 - n - dodecyloxyethyl) - 2 - chloropropionamide, N - (2 - n - tetradecyloxyethyl) - 2 - bromopropionamide, N - [2 - (7 - ethyl - 2 - methyl - 4 - undecyloxy)ethyl] - 2 - iodopropionamide and N - (2 - hexadecyloxyethyl) - 2 - chloropropionamide wherein the hexadecyl radical is derived from the above-described "Oxo" process branched-chain hexadecanol; the N - (3 - alkyloxypropyl) - 2 - halopropionamides such as N - (3 - n - dodecyloxypropyl) - 2 - chloropropionamide and N - (3 - tridecyloxypropyl) - 2 - chloropropionamide wherein the tridecyl radical is derived from the above-described branched-chain tridecanol; the N - (4 - alkyloxybutyl) - 2 - halopropionamides such as N - (4 - isooctyloxybutyl) - 2 - chloropropionamide and N - (4 - n - dodecyloxybutyl) - 2 - bromopropionamide; the N - (2 - alkyloxyethyl) - 2 - halobutyramides such as N - (2 - n - nonyloxyethyl) - 2 - chlorobutyramide and N - (2 - tridecyloxyethyl) - 2 - bromobutyramide; the N - (3 - alkyloxypropyl) - 2 - halobutyramides such as N - (3 - tridecyloxypropyl) - 2 - chlorobutyramide wherein the tridecyl radical is derived from the above-described branched-chain tridecanol and N - (3 - n - dodecyloxypropyl) - 2 - bromobutyramide; the N - (4 - alkyloxybutyl) - 2 - halobutyramides such as N - [4 - (2 - ethylhexyloxy) - butyl] - 2 - chlorobutyramide and N - (4 - n - dodecyloxybutyl) - 2 - iodobutyramide, etc.

Another class of presently useful haloalkanecarboxamides with which the thiosulfate is reacted to obtain a class of the presently provided compounds includes the N - (alkylthioalkyl) - 2 - haloalkanecarboxamides, whereby there are obtained N - (alkylthioalkyl) - 2 - (sulfothio)alkanecarboxamides; e.g., there may be employed the N - (2 - alkylthioethyl) - 2 - haloacetamides such as N - (2 - tert - octylthioethyl) - 2 - chloroacetamide, N - (2 - tert - dodecylthioethyl) - 2 - chloroacetamide, N - (2 - n - tetradecylthioethyl) - 2 - bromoacetamide, N - (2 - n - hexadecylthioethyl) - 2 - iodoacetamide and N - (2 - octadecylthioethyl) - 2 - chloroacetamide; the N - (3 - alkylthiopropyl) - 2 - haloacetamides such as N - (3 - isooctylthiopropyl) - 2 - chloroacetamide, N - (3 - undecylthiopropyl) - 2 - bromoacetamide, N - (3 - tert - dodecylthiopropyl) - 2 - chloroacetamide, N - [3 - (7 - ethyl - 2 - methyl - 4 - undecylthio)propyl] - 2 - iodoacetamide and N - (3 - octadecylthiopropyl) - 2 - chloroacetamide; the N - (4 - alkylthiobutyl) - 2 - haloacetamides such as N - (4 - n - octylthiobutyl) - 2 - chloroacetamide and N - (4 - tert - dodecylthiobutyl) - 2 - bromoacetamide; the N - (2 - alkylthioethyl) - 2 - halopropionamides such as N - (2 - n - nonylthioethyl) - 2 - chloropropionamide, N - (2 - tert - dedecylthioethyl) - 2 - chloropropionamide and N - (2 - n - tetradecylthioethyl) - 2 - bromopropionamide; the N - (3 - alkylthiopropyl) - 2 - halopropionamides such as N - (3 - isooctylthiopropyl) - 2 - bromopropionamide, N - (3 - n - dodecylthiopropyl) - 2 - chloropropionamide, N - (3 - tridecylthiopropyl) - 2 - iodopropionamide and N - (3 - octadecylthiopropyl) - 2 - chloropropionamide; the N - (4 - alkylthiobutyl) - 2 - halopropionamides such as N - (4 - alkylthiobutyl) - 2 - chloropropionamide and N - (4 - decylthiobutyl) - 2 - chloropropionamide; the N - (4 - n - dodecylthiobutyl) - 2 - chloropropionamide; the N - (2 - alkylthioethyl) - 2 - halobutyramides such as N - [2 - (2 - ethylhexylthio) - ethyl] - 2 - chlorobutyramide and N-(2-tert-dodecylthioethyl)-2-bromobutyramide; the N-(3-alkylthiopropyl)-2-halobutyramides such as N-(3-n-octylthiopropyl)-2-chlorobutyramide and N-(3-tert-dodecylthiopropyl)-2-chlorobutyramide; the N-(4-alkylthiobutyl)-2-halobutyramides such as N-(4-n-nonylthiobutyl)-2-chlorobutyramide, N-(4-tert-dodecylthiobutyl)-2-chlorobutyramide and N-(4-n-tetradecylthiobutyl)-2-bromobutyramide, etc.

Inorganic thiosulfates which are reacted with the N-(alkyloxyalkyl- or alkylthioalkyl)-2-haloalkanecarboxamides to give the present salts of N-(alkyloxyalkyl- or alkylthioalkyl)-2-(sulfothio)alkanecarboxamides are sodium, potassium, lithium or ammonium thiosulfates. The presently useful N-(alkyloxyalkyl- or alkylthioalkyl)-2-haloalkaneamides are prepared, e.g., by the reaction of chloroacetyl chloride with the appropriate (alkyloxyalkyl)-amine or (alkylthioalkyl)amine substantially as described in the copending application of Philip C. Hamm and Angelo J. Speziale, Serial No. 716,010, filed Febuary 19, 1958.

Illustrative of the N-(alkyloxyalkyl)-2-(sulfothio)-alkanecarboxamide salts provided by the invention are, e.g., the alkali metal N-(2-alkyloxyethyl)-2-(sulfothio)-acetamides such as the sodium or potassium N-(2-tert-octyloxyethyl)-2-(sulfothio)acetamide or the sodium or ammonium N-(2-n-dodecyloxyethyl)-2-(sulfothio)acetamide, sodium or lithium N-(2-hexadecycloxyethyl)-2-(sulfothio)acetamide wherein the hexadecyl radical is derived from the branched-chain hexadecanol obtained according to the "Oxo" process by the reaction of carbon monoxide and hydrogen with propylene pentamer, the sodium or potassium N-(2-octadecyloxyethyl)-2-(sulfothio)acetamide; the alkali metal N-(3-alkyloxypropyl)-2-(sulfothio)acetamides such as the potassium or ammonium N-(3-n-octyloxypropyl)-2-(sulfothio)acetamide and the sodium or lithium N-(3-tridecyloxypropyl)-2-(sulfothio)acetamide wherein the tridecyl radical is derived from the herein described branched-chain "Oxo" process tridecanol; the alkali metal N-(4-alkyloxybutyl)-2-(sulfothio)acetamides such as the sodium or potassium N-(4-decyloxybutyl)-2-(sulfothio)acetamide wherein the decyl radical is derived from the herein described branched-chain "Oxo" process decanol and the sodium or ammonium N-(4-n-dodecyloxybutyl)-2-(sulfothio)acetamide; the alkali metal N-(2-alkyloxyethyl)-2-(sulfothio)propionamides such as the sodium or potassium N-(2-n-octyloxyethyl)-2-(sulfothio)propionamide and the potassium or ammonium N-(2-tert-dodecyloxyethyl)-2-(sulfothio)propionamide; the alkali metal N-(3-alkyloxypropyl)-2-(sulfothio)propionamides such as the sodium or potassium N-(3-nonyloxypropyl)-2-(sulfothio)propionamide wherein the nonyl radical is derived from the herein described branched-chain "Oxo" process nonanol, and the potassium or ammonium N-(3-dodecyloxypropyl)-2-(sulfothio)propionamide; the alkali metal N-(4-alkyloxybutyl)-2-(sulfothio)propionamides such as the sodium butyl)-2-(sulfothio)propionamides such as the sodium or potassium N-[4-(2-ethylhexyloxy)butyl]-2-(sulfothio)propionamide and the ammonium or sodium N-(4-tert-dodecyloxybutyl)-2-(sulfothio)propionamide; the alkali metal N-(2-alkyloxyethyl)-2-(sulfothio)butyramides such as the sodium or potassium N-(2-n-decyloxyethyl)-2-(sulfothio)butyramide and the ammonium or sodium N-(2-octadecyloxyethyl)-2-(sulfothio)butyramide; the alkali metal N-(3-alkyloxypropyl)-2-(sulfothio)butyramides such as the sodium or potassium N-(3-n-octyloxypropyl)-2-(sulfothio)butyramide and the ammonium or sodium N-(3-tridecyloxypropyl)-2-(sulfothio)butyramide; the alkali metal N-(4-alkyloxybutyl)-2-(sulfothio)butyramides such as the sodium or potassium N-(4-n-octyloxybutyl)-2-(sulfothio)butyramide and the ammonium or sodium N-[4-(2-butyloctyloxy)butyl]-2-(sulfothio)butyramide, etc.

N-(alkylthioalkyl)sulfothioalkanecarboxamide salts provided by the invention include, e.g., the alkali metal N-(2-alkylthioethyl)-2-(sulfothio)acetamides such as the sodium or potassium N-(2-tert-nonylthioethyl)-2-(sulfothio)acetamide or the sodium or ammonium N-(2-tert-dodecylthioethyl)-2-(sulfothio)acetamide; the alkali metal N-(3-alkylthiopropyl)-2-(sulfothio)acetamides such as the ammonium or sodium N-(3-n-dodecylthiopropyl)-2-(sulfothio)acetamide and the sodium or lithium N-(3-n-tetradecylthiopropyl)-2-(sulfothio)acetamide; the alkali metal N-(4-alkylthiobutyl)-2-(sulfothio)acetamides such as the sodium or lithium N-(4-decylthiobutyl)-2-(sulfothio)acetamide and the sodium or ammonium N-(4-hexadecylthiobutyl)-2-(sulfothio)acetamide; the alkali metal N-(2-alkylthioethyl)-2-(sulfothio)propionamides such as the sodium or potassium N-(2-n-octylthioethyl)-2-(sulfothio)propionamide and the sodium or ammonium N-(2-octadecylthioethyl)-2-(sulfothio)propionamide; the alkali metal N-(3-alkylthiopropyl)-2-(sulfothio)propionamides such as the sodium or potassium N-(3-tert-octylthiopropyl)-2-(sulfothio)propionamide and the sodium or ammonium N-(3-hexadecylthiopropyl)-2-(sulfothio)propionamide; the alkali metal N-(4-alkylthiobutyl)-2-(sulfothio)propionamides such as the sodium or potassium N-(4-n-dodecylthiobutyl)-2-(sulfothio)propionamide and the potassium or ammonium N-(4-tridecylthiobutyl)-2-(sulfothio)propionamide; the alkali metal N-(2-alkylthioethyl)-2-(sulfothio)butyramides such as the sodium or ammonium N-(2-nonylthioethyl)-2-(sulfothio)butyramide and the sodium or potassium N-(2-tert-dodecylthioethyl)-2-(sulfothio)butyramide; the alkali metal N-(3-alkylthiopropyl)-2-(sulfothio)butyramides such as the sodium or potassium N-(3-n-octylthiopropyl)-2-(sulfothio)butyramide and the sodium or lithium N-(3-tert-dodecylthiopropyl)-2-(sulfothio)butyramide; the alkali metal N-(4-alkylthiobutyl)-2-(sulfothio)butyramides such as the sodium or potassium N-(4-tert-decylthiobutyl)-2-(sulfothio)butyramide and the potassium or lithium N-(4-octadecylthiobutyl)-2-(sulfothio)butyramide.

Reaction of the presently useful N-(alkyloxyalkyl- or alkylthioalkyl)-2-haloalkanecarboxamides with the alkali metal or ammonium thiosulfates takes place readily by contacting a mixture of the two reactants at ordinary or increased temperatures and preferably at a temperature of from, say, 50° C. to 150° C. in the presence or absence of an inert diluent or solvent. Refluxing temperatures are generally preferred. For smooth reaction, a diluent is generally recommended. Conveniently, this may be a mixture of solvents for the inorganic and organic constituents of the reaction mixture, e.g., a mixture of water and an organic liquid such as ethanol, isopropanol, benzene, acetone, ethyl ether, etc. The by-product alkali metal or ammonium halide is readily removed either by decantation and/or alternate concentration, dissolution and precipitation. An alternative procedure involves extraction of the (sulfothio)alkanecarboxamide salt with an organic solvent such as isopropanol, acetone, chloroform or tetrahydrofuran, stripping off the solvent from the extract, and final oven- or spray-drying. The present N-(alkyloxyalkyl- or alkylthioalkyl)-2-(sulfothio)alkanecarboxamide salts are well defined, stable compounds which range generally from crystalline to somewhat waxy solids. While they may be employed for a variety of commercial and agricultural purposes, they are most advantageously used as surface-active materials, i.e., as detersive, wetting-out and lathering agents.

The invention is further illustrated, but not limited, by the following examples:

*Example 1*

A mixture consisting of 18.0 g. (0.0682 mole) of N-[3-(2-ethylhexyloxy)propyl]-2-chloroacetamide and 50 ml. of an aqueous solution of sodium thiosulfate containing 0.10 mole of the thiosulfate and 50 ml. of ethanol was heated for approximately one hour at a temperature of 80° C. The reaction mixture was then dried by distillation in the presence of isopropanol, whereby ethanol-water was stripped off at reduced pressure while being gradually replaced by the isopropanol. Treatment of the dried product with charcoal, filtration in the presence of a filter aid and subsequent vacuum drying gave 25.5 g. of the gum-like sodium N-[3-(2-ethylhexyloxy)propyl]-2-(sulfothio)acetamide.

*Example 2*

A mixture consisting of 16.8 g. (0.060 mole) of N-(2-n-nonylthioethyl)-2-chloroacetamide, 26.7 ml. of an aqueous sodium thiosulfate solution containing 0.08 mole of the thiosulfate, and 50 ml. of ethanol was heated with stirring for 2 hours at about 80° C. Ethanol and water were removed from the resulting reaction mixture by distilling at reduced pressure while adding isopropanol. The resulting solution still contained inorganic salt; accordingly, it was filtered hot, cooled and again filtered. After rinsing the solids with isopropanol, the filtrate deposited 9.8 g. of the white, crystalline sodium N-(2-n-nonylthioethyl)-2-(sulfothio)-acetamide, a redried sample of which analyzed 3.64% nitrogen as against 3.69%, the calculated value. A further 9.3 g. of the amide was obtained by concentrating the isopropanol washings to dryness.

*Example 3*

The N-(alkoxyalkyl)-2-chloroacetamide employed in this Example was an N-(3-tridecyloxypropyl)-2-chloroacetamide wherein the tridecyl radical was derived from a branched-chain tridecanol obtained according to the "Oxo" process by the catalytic, high pressure reaction of propylene tetramer with carbon monoxide and hydrogen.

A mixture consisting of 23.6 g. (0.0706 mole) of the amide and 50 ml. of an aqueous sodium thiosulfate solution containing 0.1 mole of the thiosulfate was heated with 50 ml. of ethanol at a temperature of about 80° C. for approximately one hour. Distillation of the resulting reaction mixture at reduced pressure while adding isopropanol to replace the azeotrope of ethanol and water, filtration, and vacuum drying of the residue to remove the isopropanol gave the crude product. This was purified by solution in a mixture of water and isopropanol, treatment with charcoal, filtration and redrying with isopropanol as above. There was thus obtained 31 g. of the substantially pure sodium N-(3-tridecyloxypropyl)-2-(sulfothio)acetamide.

*Example 4*

A mixture consisting of 42.0 g. (0.106 mole) of N-(3-octadecyloxypropyl)-2-chloroacetamide, 27.8 g. (0.12 mole) of sodium thiosulfate, 100 g. of ethanol and 100 g. of water was heated for 1.5 hours at 80° C. Water and ethanol were removed by distilling under reduced pressure while adding isopropanol. The residue was vacuum-dried, recrystallized from about 500 ml. of isopropanol, and oven-dried to give 32 g. of the solid, somewhat waxy sodium N-(3-octadecyloxypropyl)-2-(sulfothio)-acetamide.

*Example 5*

This Example describes evaluation of the surface-active properties of the sodium N-(3-tridecyloxypropyl)-2-(sulfothio)-acetamide prepared in Example 3.

Detergency tests were conducted according to the method described by J. C. Harris and Earl L. Brown, J. Amer. Oil Chemists' Soc., 27, 135–143 (1950), wherein the detersive efficiency of a composition is compared to a commercially available product known as "Gardinol" (sodium lauryl sulfate). Employing this test, said sodium salt was found to have 108% of the detersive efficiency of "Gardinol" in water of 300 p.p.m. hardness.

Evaluation of the wetting-out efficiency of said sodium salt by the Draves Test gave the following results at the indicated concentrations:

| Percent concentration: | Speed of wetting, seconds |
|---|---|
| 0.5 | 2.9 |
| 0.25 | 3.9 |
| 0.125 | 6.0 |
| 0.062 | 14.8 |
| 0.031 | 69.9 |
| 0.015 | 180+ |

*Example 6*

Evaluation of the lathering efficiency of the sodium N-(3-tridecyloxypropyl)-2-(sulfothio)acetamide of Example 3 and of the sodium N-(2-n-nonylthioethyl)-2-(sulfothio)acetamide of Example 2 was conducted in water of 300 p.p.m. hardness according to the Ross-Miles Lather Test of the American Society for Testing Materials. With the compound of Example 3 there was obtained a lather height of 22.0 cm. at once and 22.0 cm. after 5 minutes. Similarly obtained results for the compound of Example 2 were 21.0 cm. at once and 20.6 cm. after 5 minutes.

What I claim is:

1. A compound of the formula

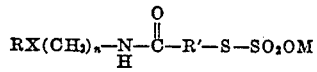

wherein R is an alkyl radical of from 8 to 18 carbon atoms, X is selected from the class consisting of oxygen and sulfur, $n$ is an integer of from 2 to 4, R' is an alkylidene radical of from 1 to 3 carbon atoms, and M is selected from the class consisting of alkali metal and ammonium.

2. A compound of the formula

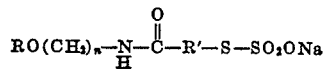

wherein R is an alkyl radical of from 8 to 18 carbon atoms, $n$ is an integer of from 2 to 4, and R' is an alkylidene radical of from 1 to 3 carbon atoms.

3. A compound of the formula

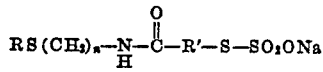

wherein R is an alkyl radical of from 8 to 18 carbon atoms, $n$ is an integer of from 2 to 4, and R' is an alkylidene radical of from 1 to 3 carbon atoms.

4. An alkali metal N-(2-alkylthioethyl)-2-(sulfothio)-acetamide in which the alkyl radical has from 8 to 18 carbon atoms.

5. An alkali metal N-(3-alkloxypropyl)-2-(sulfothio)-acetamide in which the alkyl radical has from 8 to 18 carbon atoms.

6. Sodium N-[3-(2-ethylhexyloxy)propyl]-2-(sulfothio)acetamide.

7. Sodium N-(2-n-nonylthioethyl)-2-(sulfothio)acetamide.

8. Sodium N-(3-tridecyloxypropyl)-2-(sulfothio)acetamide.

9. Sodium N-(3-octadecyloxypropyl)-2-(sulfothio)acetamide.

References Cited in the file of this patent

UNITED STATES PATENTS

| 1,969,612 | Kaiser et al. | Aug. 7, 1934 |
| 2,004,873 | Kirstahler | June 11, 1935 |

FOREIGN PATENTS

| 171,352 | Switzerland | Nov. 16, 1934 |